(12) United States Patent
Wilson et al.

(10) Patent No.: US 8,902,525 B1
(45) Date of Patent: Dec. 2, 2014

(54) SYSTEMS AND METHODS FOR INDIRECT PARAMETER CALIBRATION IN A DATA PROCESSING SYSTEM

(71) Applicant: LSI Corporation, San Jose, CA (US)

(72) Inventors: Bruce A. Wilson, San Jose, CA (US); Jianzhong Huang, Storrs, CT (US); Haitao Xia, San Jose, CA (US); Lu Lu, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/962,219

(22) Filed: Aug. 8, 2013

Related U.S. Application Data (60) Provisional application No. 61/857,896, filed on Jul. 24, 2013.

(51) Int. Cl.
*G11B 5/09* (2006.01)

(52) U.S. Cl.
CPC .......................................... *G11B 5/09* (2013.01)
USPC ............................................... 360/46; 360/25

(58) Field of Classification Search
None
See application file for complete search history.

(56) References Cited

U.S. PATENT DOCUMENTS 7,974,032 B1 * 7/2011 Song et al. ...................... 360/45

* cited by examiner

*Primary Examiner* — Daniell L Negron
(74) *Attorney, Agent, or Firm* — Hamilton DeSanctis & Cha (57) ABSTRACT

The present invention is related to systems and methods for adaptive parameter modification in a data processing system.

20 Claims, 6 Drawing Sheets

SYSTEMS AND METHODS FOR INDIRECT PARAMETER CALIBRATION IN A DATA PROCESSING SYSTEM

CROSS REFERENCE TO RELATED APPLICATIONS

The present application claims priority to (is a non-provisional of) U.S. Pat. App. No. 61/857,896 entitled "Systems and Methods for Indirect Parameter Calibration In A Data Processing System", and filed Jul. 24, 2013 by Wilson et al. The entirety of the aforementioned provisional patent application is incorporated herein by reference for all purposes.

BACKGROUND OF THE INVENTION

The present invention is related to systems and methods for performing data processing, and more specifically to systems and methods for adaptive parameter modification in a data processing system.

Various data transfer systems have been developed including storage systems, cellular telephone systems, radio transmission systems. In each of the systems data is transferred from a sender to a receiver via some medium. For example, in a storage system, data is sent from a sender (i.e., a write function) to a receiver (i.e., a read function) via a storage medium. The effectiveness of any transfer is impacted by the quality of processing performed. To improve the processing, one or more elements of the data processing circuit may be tuned through parameter modification. In some systems such parameter modification is done using a search approach where parameter after parameter are tested. This is a reasonable approach where only a very limited number of parameters are to be searched, but it becomes unwieldy when the number of parameters increases. To deal with this traditional systems have typically limited the number of parameters, but this limits the tuning that can be done and therefore negatively impacts performance.

Hence, for at least the aforementioned reasons, there exists a need in the art for advanced systems and methods for data processing.

BRIEF SUMMARY OF THE INVENTION

The present invention is related to systems and methods for performing data processing, and more specifically to systems and methods for adaptive parameter modification in a data processing system.

Various embodiments of the present invention provide data processing systems that include: a write circuit and a read circuit. The write circuit includes a write processing circuit and a calibration circuit. The write processing is operable to modify a write data set based at least in part on a write parameter to yield a write output, and the calibration circuit is operable to adjust the write parameter based at least in part on a detector output. The read circuit includes a data detector circuit operable to generate the detector output based upon a detector input derived from a read input. The read input corresponds to the write output transferred via a medium.

This summary provides only a general outline of some embodiments of the invention. The phrases "in one embodiment," "according to one embodiment," "in various embodiments", "one or more embodiments", "particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 1b shows one implementation of a parameter calibration circuit that may be used in relation to the data processing circuit of FIG. 1a;

DETAILED DESCRIPTION OF THE INVENTION

The present invention is related to systems and methods for performing data processing, and more specifically to systems and methods for adaptive parameter modification in a data processing system.

Various embodiments of the present invention provide data processing circuits that include a data detector circuit and a data decoder circuit. The data detector circuit includes one or more noise predictive filtering circuits as part of the data detector circuit. A detected output from the data detector circuit is provided to the data decoder circuit that applies a data decode algorithm in an attempt to recover an originally written data set. Where application of the data decode algorithm yields the originally written data set, the decoded output is said to have "converged". In some cases, such convergence is indicated by satisfaction of all parity check equations relied upon in the data decode algorithm. Based upon the disclosure provided herein, one of ordinary skill in the art will recognize a variety of scenarios in which the decoded output is considered to have converged. Such a converged data set is provided as an output from the data processing circuit. A pass through both the data detector circuit and the data decoder circuit is referred to herein as a "global iteration". In some cases, the data processing circuit is designed to allow multiple global iterations. In various cases, the data decoding circuit may apply the data decode algorithm to the detected output multiple times during a given global iteration. In such cases, each application of the data decode algorithm is referred to herein as a "local iteration".

Various embodiments of the present invention provide data processing systems that include: a write circuit and a read circuit. The write circuit includes a write processing circuit and a calibration circuit. The write processing is operable to modify a write data set based at least in part on a write parameter to yield a write output, and the calibration circuit is operable to adjust the write parameter based at least in part on a detector output. The read circuit includes a data detector circuit operable to generate the detector output based upon a detector input derived from a read input. The read input corresponds to the write output transferred via a medium. In some instances of the aforementioned embodiments, the detector output is one or both of a noise predictive output and an edge mean value. In various cases, the medium is a storage medium, and the data processing system is implemented as part of a storage device. In one or more cases, the data processing system is implemented as part of an integrated circuit.

In various instances of the aforementioned embodiments, the write parameter is a first write parameter, and the write processing circuit further includes: a write pre-compensation circuit and a write driver circuit. The write pre-compensation circuit is operable to modify the write data set based at least in part on the first write parameter to yield an interim data set. The write driver circuit is operable to adjust the interim data set based at least in part on a second write parameter to yield the write output in a form acceptable to a write head disposed in relation to the medium. In such instances, the calibration circuit is operable to adjust the second write parameter based at least in part on the detector output.

In one or more instances of the aforementioned embodiments, the detector output is a noise predictive output, the data detector circuit is further operable to calculate an edge mean value corresponding to the noise predictive output, and the calibration circuit is operable to adjust the write parameter based at least in part on both the noise predictive output and the edge mean value. In some cases, the noise predictive output is a first noise predictive output and the edge mean value is a first edge mean value; wherein the data detector circuit is operable to calculate a second edge mean value and a second noise predictive output using the same detector input used to calculate the first edge mean value and the first noise predictive output. The calibration circuit is operable to adjust the write parameter based at least in part on all of the first noise predictive output, the second noise predictive output, the first edge mean value, and the second edge mean value. In one or more cases, the write circuit further includes a gradient calculation circuit. The gradient calculation circuit is operable to: receive a first gradient input derived from the read input corresponding to a first instance of the write parameter; receive a second gradient input derived from the read input corresponding to a second instance of the write parameter; and calculate a gradient as a difference between the first gradient input and the second gradient input. The calibration circuit is operable to adjust the write parameter based at least in part on all of the noise predictive output, the edge mean value, and the gradient.

Yet other instances of the aforementioned embodiments, the write circuit further includes a gradient calculation circuit operable to: receive a first gradient input derived from the read input corresponding to a first instance of the write parameter; receive a second gradient input derived from the read input corresponding to a second instance of the write parameter; and calculate a gradient as a difference between the first gradient input and the second gradient input. In some cases, the calibration circuit is operable to adjust the write parameter based at least in part on both the detector output and the gradient.

Figure 1A:
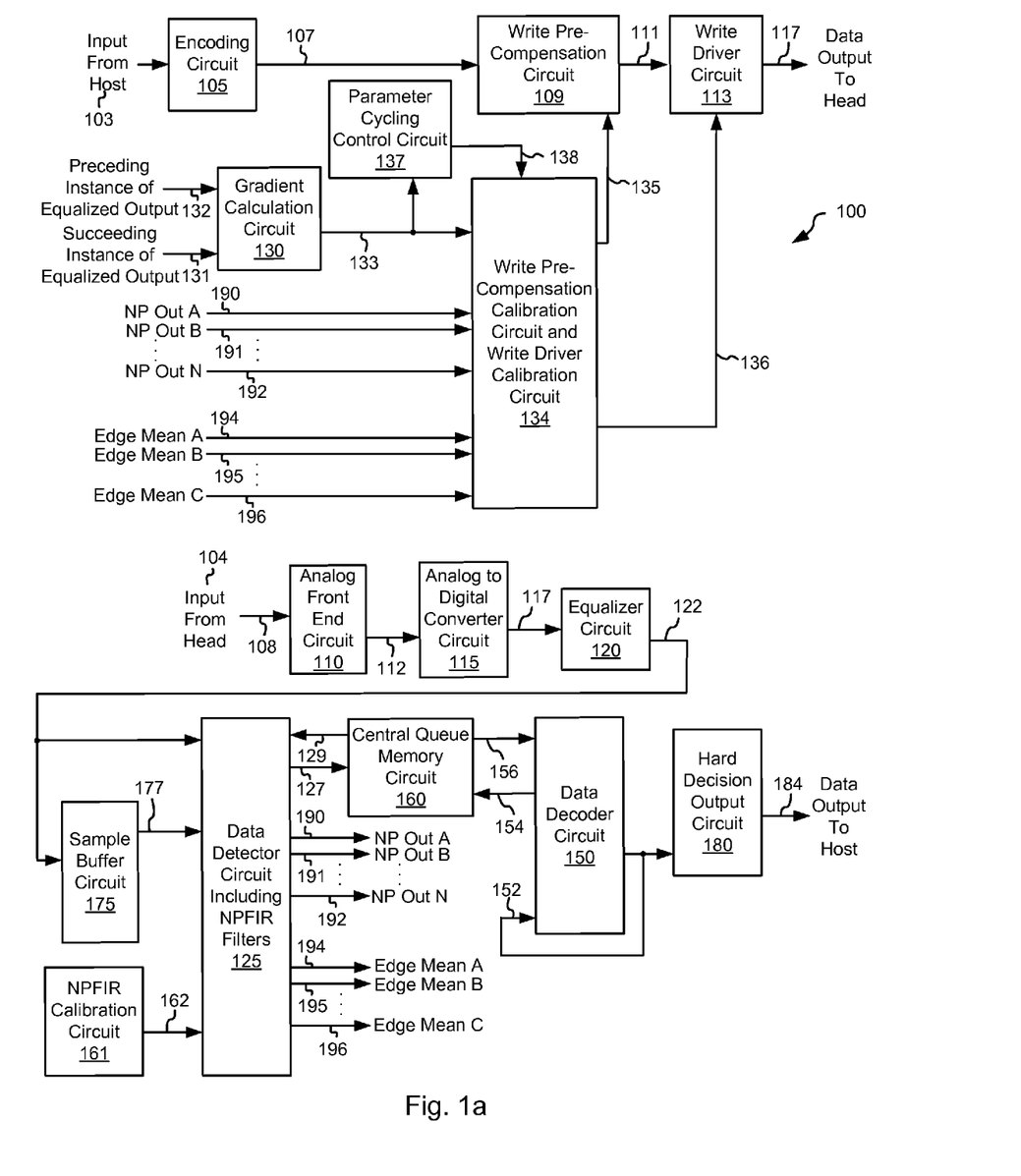
FIG. 1a depicts a data processing circuit having indirect parameter calibration circuitry in accordance with some embodiments of the present invention.

Turning to FIG. 1a, data processing circuit 100 having indirect parameter calibration circuitry is shown in accordance with some embodiments of the present invention. Data processing circuit 100 includes write circuitry. The write circuitry includes an encoding circuit 105 that receives an input 103 from a host (not shown) and encodes the input to yield an encoded output 107. The encoding may be any form of encoding known in the art including, but not limited to, one or more of run length limited encoding and low density parity check encoding. Based upon the disclosure provided herein, one of ordinary skill in the art will recognize a variety of encoding circuits that may be used as encoding circuit 105 and/or a variety of different encoding algorithms that may be used in accordance with different embodiments of the present invention.

Encoded output 107 is provided to a write pre-compensation circuit 109 that is operable to adjust the encoded output to address one or more physical conditions into which the encoded output will be stored or transmitted. Based upon the disclosure provided herein, one of ordinary skill in the art will recognize a variety of write pre-compensation circuits that may be used in relation to different embodiments of the present invention. The write pre-compensation algorithm implemented by write pre-compensation circuit 109 is applied to encoded output 107 to yield a compensated output 111. Application of the write pre-compensation algorithm is controlled by one or more parameters organized as a set of write pre-compensation parameters 135. These write pre-compensation parameters 135 are stored to registers in write pre-compensation circuit 109, and are updated by a write pre-compensation calibration circuit and write driver calibration circuit 134 as more fully described below.

Compensated output 111 is provided to a write driver circuit 113 that formats the data to be transferred either via transmission to a receiver or to a storage medium. Based upon the disclosure provided herein, one of ordinary skill in the art will recognize a variety of write driver circuits that may be used in relation to different embodiments of the present invention. The processes applied by write driver circuit 113 yield a data output 117 that may be provided to a read/write head (not shown) or a transmitter (not shown) Operation of write driver circuit 113 is controlled by one or more parameters organized as a set of write driver parameters 136. These write driver parameters 136 are stored to registers in write driver circuit 113, and are updated by write pre-compensation calibration circuit and write driver calibration circuit 134 as more fully described below.

Data is received as an input 104. An analog front end circuit 110 processes input 104 to yield a processed analog signal 112 that is provided to an analog to digital converter circuit 115. Analog front end circuit 110 may include, but is not limited to, an analog filter and an amplifier circuit as are known in the art. Based upon the disclosure provided herein, one of ordinary skill in the art will recognize a variety of circuitry that may be included as part of analog front end circuit 110. In some cases, input 104 is derived from a read/write head assembly (not shown) that is disposed in relation to a storage medium (not shown). In other cases, input 104 is derived from a receiver circuit (not shown) that is operable to receive a signal from a transmission medium (not shown). The transmission medium may be wired or wireless. Based upon the disclosure provided herein, one of ordinary skill in the art will recognize a variety of sources from which input 104 may be derived.

Analog to digital converter circuit 115 converts processed analog signal 112 into a corresponding series of digital samples 117. Analog to digital converter circuit 115 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 117 are provided to an equalizer circuit 120. Equalizer circuit 120 applies an equalization algorithm to digital samples 117 to yield an equalized output 122. In some embodiments of the present invention, equalizer circuit 120 is a digital finite impulse response filter circuit as are known in the art.

Equalized output 122 is provided to both a data detector circuit 125 and to a sample buffer circuit 175. In some cases data detector circuit 125 includes a primary data detector circuit and a secondary data detector circuit. In such a case, equalized output 122 is provided to both the secondary data detector circuit and to sample buffer circuit 175. Sample buffer circuit 175 stores equalized output 122 as buffered data 177 for use in subsequent iterations through data detector circuit 125. Data detector circuit 125 may be any data detector circuit known in the art that is capable of producing a detected output 127. As some examples, data detector circuit 125 may be, but is not limited to, a Viterbi algorithm detector circuit or a maximum a posteriori detector circuit as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention. Detected output 127 may include both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Data detector circuit 125 includes a number of noise predictive filter circuits (NPFIRs) that provide noise predictive filtering that yield noise predictive outputs (i.e., NP Out A 190, NP Out B 191, and NP Out N 192). The number of noise predictive filters is typically eight or sixteen, but may be any number depending upon the particular embodiment of the present invention. These noise predictive outputs are interim outputs used in generating detected output 127. In addition, data detector circuit 125 provides a number of edge mean values (i.e., Edge Mean Value A 194, Edge Mean Value B 195, and Edge Mean Value N 196) that correspond to different potential paths that are selected between in determining detected output 127. Thus, the edge mean values are also interim values generated by data detector circuit 125. An NPFIR calibration circuit 161 performs calibration of one or more noise predictive filter coefficients 162 that control the operation of the NPFIRs included in data detector circuit 125. Based upon the disclosure provided herein, one of ordinary skill in the art will recognize one or more approaches for NPFIR calibration and therefore implementations of NPFIR calibration circuit 161 that may be used in relation to different embodiments of the present invention.

Detected output 127 is provided to a central queue memory circuit 160 that operates to buffer data passed between data detector circuit 125 and data decoder circuit 150. In some cases, central queue memory circuit 160 includes interleaving (i.e., data shuffling) and de-interleaving (i.e., data un-shuffling) circuitry known in the art. When data decoder circuit 150 is available, data decoder circuit 150 accesses detected output 127 from central queue memory circuit 160 as a decoder input 156. Data decoder circuit 150 applies a data decoding algorithm to decoder input 156 in an attempt to recover originally written data. The result of the data decoding algorithm is provided as a decoded output 152. Similar to detected output 127, decoded output 152 may include both hard decisions and soft decisions. For example, data decoder circuit 150 may be any data decoder circuit known in the art that is capable of applying a decoding algorithm to a received input. Data decoder circuit 150 may be, but is not limited to, a low density parity check (LDPC) decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs (e.g., if sample buffer circuit 175 is close to getting filled up), decoded output 152 is stored to a memory included in a hard decision output circuit 180. In turn, hard decision output circuit 180 provides the converged decoded output 152 as a data output 184 to a recipient (not shown). The recipient may be, for example, an interface circuit operable to receive processed data sets. Based upon the disclosure provided herein, one of ordinary skill in the art will recognize a variety of recipients that may be used in relation to different embodiments of the present invention. Where the original data is not recovered (i.e., the data decoding algorithm failed to converge) prior to a timeout condition, decoded output 152 indicates that the data is unusable as is more specifically discussed below, and data output 184 is similarly identified as unusable.

One or more iterations through the combination of data detector circuit 125 and data decoder circuit 150 may be made in an effort to converge on the originally written data set. As mentioned above, processing through both the data detector circuit and the data decoder circuit is referred to as a "global iteration". For the first global iteration, data detector circuit 125 applies the data detection algorithm to equalized output 122 without guidance from a decoded output. For subsequent global iterations, data detector circuit 125 applies the data detection algorithm to buffered data 177 as guided by decoded output 152. To facilitate this guidance, decoded output 152 is stored to central queue memory circuit 160 as a decoder output 154, and is provided from central queue memory circuit 160 as a detector input 129 when equalized output 122 is being re-processed through data detector circuit 125.

During each global iteration it is possible for data decoder circuit 150 to make one or more local iterations including application of the data decoding algorithm to decoder input 156. For the first local iteration, data decoder circuit 150 applies the data decoder algorithm without guidance from decoded output 152. For subsequent local iterations, data decoder circuit 150 applies the data decoding algorithm to decoder input 156 as guided by a previous decoded output 152. The number of local iterations allowed may be, for example, ten. Based upon the disclosure provided herein, one of ordinary skill in the art will recognize a variety of different numbers of local iterations that may be allowed in accordance with different embodiments of the present invention. Where the number of local iterations through data decoder circuit 150 exceeds that allowed, but it is determined that at least one additional global iteration during standard processing of the data set is allowed, decoded output 152 is provided back to central queue memory circuit 160 as decoded output 154. Decoded output 154 is maintained in central queue memory circuit 160 until data detector circuit 125 becomes available to perform additional processing.

In contrast, where the number of local iterations through data decoder circuit 150 exceeds that allowed and it is determined that the allowable number of global iterations has been surpassed for the data set and/or a timeout or memory usage calls for termination of processing of the particular data set, standard processing of the data set concludes and an error is indicated. In some cases, retry processing or some offline processing may be applied to recover the otherwise unconverged data set. Based upon the disclosure provided herein, one of ordinary skill in the art will recognize a variety of additional processing techniques that may be applied to recover the otherwise unrecoverable data set.

A gradient calculation circuit 130 receives an instance of equalized output 122 (i.e., an input 132) that corresponds to data originally written using an initial parameter set (i.e., an initial set of values for parameter set 135 and parameter set 136), and an instance of equalized output (i.e., an input 131) that corresponds to data originally written using a modified parameter set (i.e., the initial parameter set with one or more values modified). Gradient calculation circuit 130 calculates a difference between input 131 and input 132 on a position by position basis (e.g., on a bit by bit basis for a binary data processing system or on a symbol by symbol basis for a non-binary data processing system) to yield a gradient 133 that is provided to a parameter cycling and control circuit 137 and write pre-compensation calibration circuit and write driver calibration circuit 134.

In addition, write pre-compensation calibration circuit and write driver calibration circuit 134 receives the noise predictive outputs (i.e., NP Out A 190, NP Out B 191, and NP Out N 192) and the edge mean values (i.e., Edge Mean Value A 194, Edge Mean Value B 195, and Edge Mean Value N 196) generated by data detector circuit 125 when processing the instance of equalizer output corresponding to input 131. Write pre-compensation calibration circuit and write driver calibration circuit 134 uses the received data to calculate updated parameter set 135 and parameter set 136. In particular, write pre-compensation calibration circuit and write driver calibration circuit 134 calculates the updated parameters in accordance with the following equation:

$$\text{parameter}_{k,b_{i_{-M:i}}} = \text{parameter}_{k,b_{i_{-M:i}}} - t\frac{\partial \Delta_e}{\partial \text{parameter}_{k,b_{i_{-M:i}}}},$$

where $\Delta_e$ is a path metric difference between the most likely path selected by data detector circuit 125 and the second most likely path. This path metric difference may be calculated in accordance with the following equation:

$$\Delta_e = \sum_{i=0}^{I}\left(NPout_{k,i} - \bar{y}_{k,b_{k,i_{-D:i}}}\right)^2 - \sum_{i=0}^{I}\left(NPout_{v,i} - \bar{y}_{v,b_{v,i_{-D:i}}}\right)^2.$$

In the aforementioned equation, $b_{v,i-D:i}$ is the branch index corresponding to the most likely path selected by detector circuit 125, and $b_{k,i-D:i}$ is the branch index corresponding to the most likely path. The noise predictive value for the most likely path, $NPout_{k,i}$, and the noise predictive value for the most likely path selected by data detector circuit 125, $NPout_{v,i}$ are generated by NPFIRs in data detector circuit 125 in accordance with the following equations:

$$NPout_{k,i} = \sum_{j=0}^{G} h_{k,j} y_{i-j} \text{ and } NPout_{v,i} = \sum_{j=0}^{G} h_{v,j} y_{i-j},$$

where $h_{k,j}$ is the noise predictive filter coefficient 162 for the most likely path, and $h_{v,j}$ is the noise predictive equalizer coefficient 162 for the most likely path.

In updating the parameters, write pre-compensation calibration circuit and write driver calibration circuit 134 operates to reduce the value of $\Delta_e$. In doing so, the aforementioned parameter update equation (i.e., $\text{parameter}_{k,b_{i-M:i}}$) may be restated as:

$$\text{parameter}_{k,b_{i_{-M:i}}} =$$

$$\text{parameter}_{k,b_{i_{-M:i}}} - t\left[\left(NPout_{k,i} - \bar{y}_{k,b_{i_{-D:i}}}\right)h_{k,j}E\left(\frac{\partial y_{i-j}}{\partial \text{parameter}_{k,b_{i_{-M:i}}}}\right)\right],$$

where the chain rule is used to reduce the $$\frac{\partial \Delta_e}{\partial \text{parameter}_{k,b_{i_{-M:i}}}}$$

component. The $\text{parameter}_{k,b_{i-M:i}}$ is the specific parameter being updated and is distinguished from the other parameters in a parameter set being adapted by k, $b_{i_{-M:i}}$. In particular, the designator k, $b_{i_{-M:i}}$ designates the particular parameter in the parameter set (indicated by k) based on data from the detector path (indicated by $b_{i_{-M:i}}$). The $\bar{y}_{k,b_{i-D:i}}$ component is a respective one of the edge mean values designated by k,$b_{i_{-D:i}}$; the $NPout_{k,i}$ component is a respective one of the noise predictive outputs designated by k,i; the t component is a programmable update gain value; the $$E\left(\frac{\partial y_{i-j}}{\partial \text{parameter}_{k,b_{i_{-M:i}}}}\right)$$

component is the actual gradient which is approximated by the value of gradient 133 that is calculated by gradient calculation circuit 130. The process of updating the parameters may be repeated a defined number of times, until a differential value $$\left(\text{i.e., the value of } \left[\left(NPout_{k,i} - \overline{y}_{k,b_{i-D:i}}\right)h_{k,j}E\left(\frac{\partial y_{i-j}}{\partial \text{parameter}_{k,b_{i-M:i}}}\right)\right]\right)$$

is less than a threshold value, or until either of the aforementioned occurs. Based upon the disclosure provided herein, one of ordinary skill in the art will recognize a variety of limits that may be used to terminate the updating process.

Parameter cycling control circuit 137 provides a control 138 to write pre-compensation calibration circuit and write driver calibration circuit 134 that governs an iterative process of updating parameters. In particular, an initial set of values for parameter set 135 are provided to write pre-compensation circuit 109 and an initial set of values for parameter set 136 are provided to write driver circuit 113 where they are used to prepare data to be provided as data output 117. This data output 117 is then read back as input 104 to yield equalized output 122 that is used as input 132. Parameter cycling control circuit 137 directs a change in one value in the parameter set 135, and the process of providing data output 117 and read back to yield an updated equalized output 122 is performed, with the updated equalized output being used as input 131. Gradient calculation circuit 130 calculates and stores gradient 133 in relation to the particular parameter of parameter set 135 that was changed. In addition, noise predictive outputs and edge mean values corresponding to the equalized output 122 used as input 131 are stored.

The parameter that was modified is then set back to the initial value and the process is repeated for each parameter in parameter set 135 and parameter set 136, and gradient values 133 are calculated and stored for each of the individual values. The gradient values 133, edge mean values and noise predictive values for each individual parameter in parameter set 135 and parameter set 136 are used to calculate updated parameter values in accordance with the previously discussed equations. The newly calculated parameter values are provided as parameter set 135 and parameter set 136. Where either a defined number of updates of parameter set 135 and parameter set 136 have been completed or the differential value is less than a threshold, the updating is complete and the current values for parameter set 135 and parameter set 136 are used for standard data processing. Alternatively, where the updating is not yet complete, the current values for parameter set 135 and parameter set 136 are designated as the initial set of values, and the process of updating is repeated.

Of note, while the process of updating is described as modifying parameters in both parameter set 135 and parameter set 136 together, each of parameter set 135 and parameter set 136 may be individually updated. Also, it should be noted that the data output 117 may be provided and read back a number of times, and an average of the corresponding equalized outputs calculated before being provided as input 131 and input 132, respectively. Such an approach reduces the effect of noise in the system.

Figure 1B:
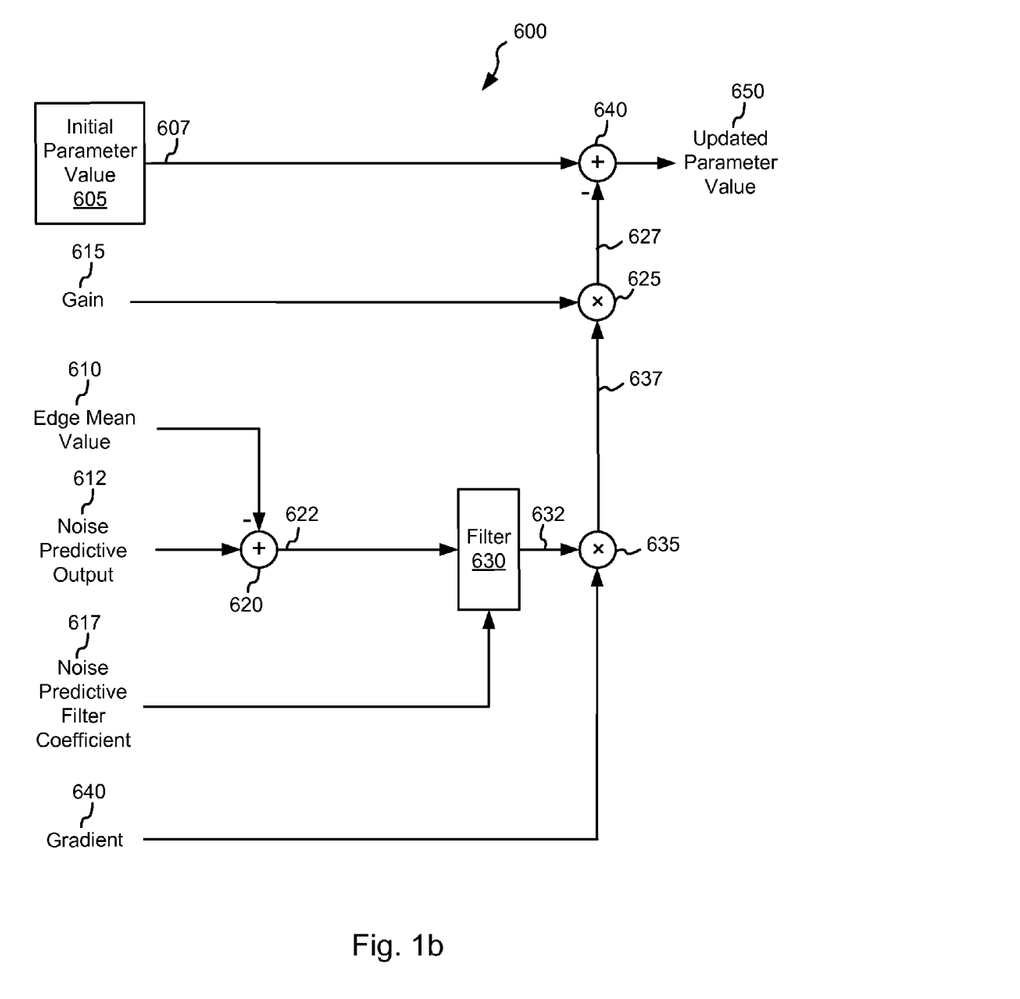

FIG. 1b shows one implementation of a parameter calibration circuit 600 that may be used in place of write pre-compensation calibration circuit and preamplifier calibration circuit 134 discussed above in relation to FIG. 1a. Where parameter calibration circuit 600 is used in place of write pre-compensation calibration circuit and preamplifier calibration circuit 134, edge mean value 610 is connected to one of the edge mean values corresponding to input 131, noise predictive output 612 is connected to one of the noise predictive values corresponding to input 131, gain 615 is the programmable update gain value, noise predictive filter coefficient 617 is connected to one of the noise predictive filter coefficients 162, and gradient 640 us connected to gradient 133. A register 605 holds an initial parameter value 607 that is updated each time the parameter set is updated.

Parameter calibration circuit 600 includes a summation circuit 620 that subtracts edge mean value 610 from noise predictive output 610 to yield a sum 622. Sum 622 corresponds to the $NPout_{k,i} - \overline{y}_{k,b_{i-D:i}}$ component of the parameter update equation discussed above in relation to FIG. 1a above. Sum 622 is provided to a filter 630 that operates based upon noise predictive filter coefficients 617 to yield a filtered output 632. Filtered output 632 corresponds to the $(NPout_{k,i} - \overline{y}_{k,b_{i-D:i}})h_{k,j}$ component of the parameter update equation discussed above in relation to FIG. 1a above. Filtered output 635 is multiplied by gradient 133 using a multiplier circuit 635 to yield a differential value 637. Differential value 637 corresponds to the differential value component, $$\left[\left(NPout_{k,i} - \overline{y}_{k,b_{i-D:i}}\right)h_{k,j}E\left(\frac{\partial y_{i-j}}{\partial \text{parameter}_{k,b_{i-M:i}}}\right)\right],$$

of the parameter update equation discussed above in relation to FIG. 1a above. Differential value 637 is multiplied by gain 615 using a multiplier circuit 625 to yield a product 627. Product 627 corresponds to the $$t\left[\left(NPout_{k,i} - \overline{y}_{k,b_{i-D:i}}\right)h_{k,j}E\left(\frac{\partial y_{i-j}}{\partial \text{parameter}_{k,b_{i-M:i}}}\right)\right]$$

component of the parameter update equation discussed above in relation to FIG. 1a above. Product 627 is subtracted from initial parameter value 607 by a summation circuit 640 to yield updated parameter value 650.

Figure 2A:
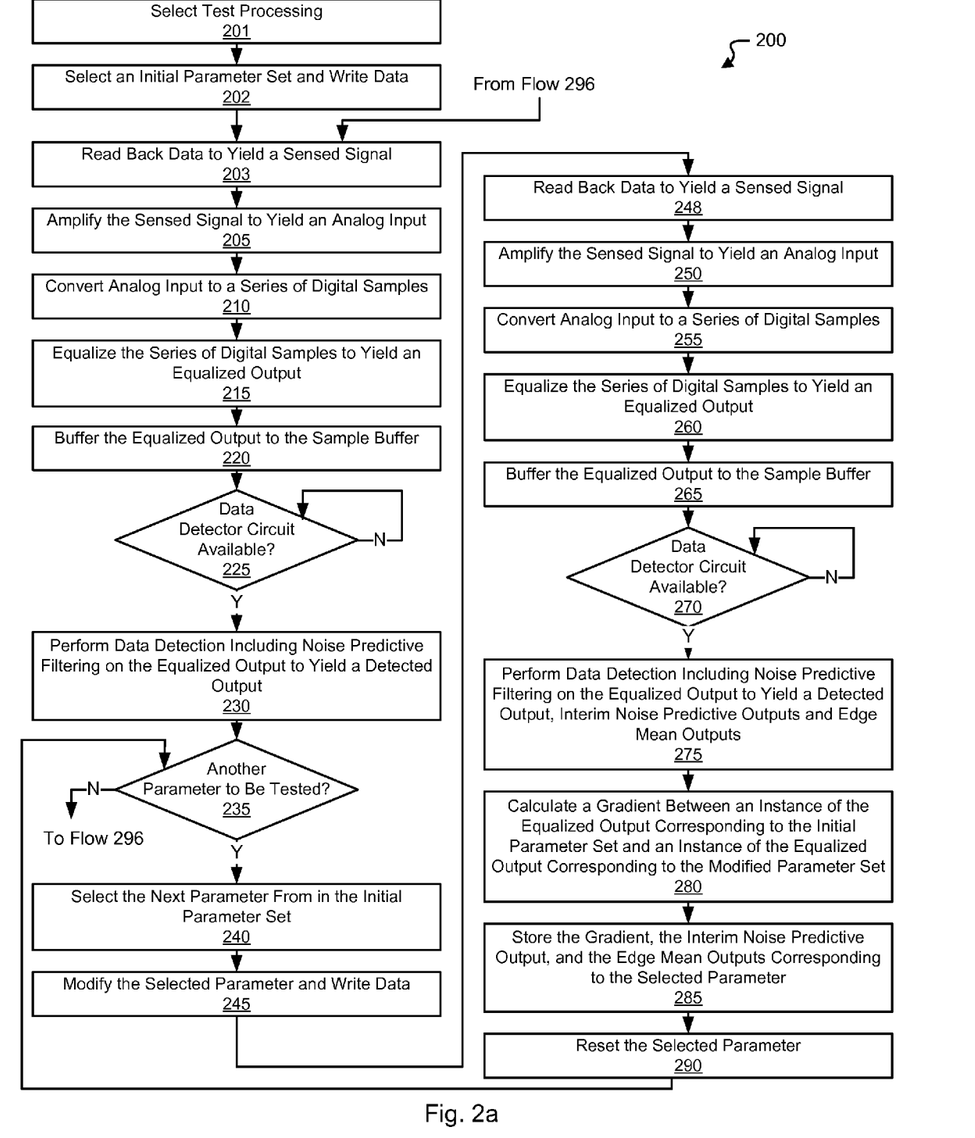
FIGS. 2a-2b are flow diagrams showing a method in accordance with some embodiments of the present invention for indirect parameter calibration.
Figure 2B:
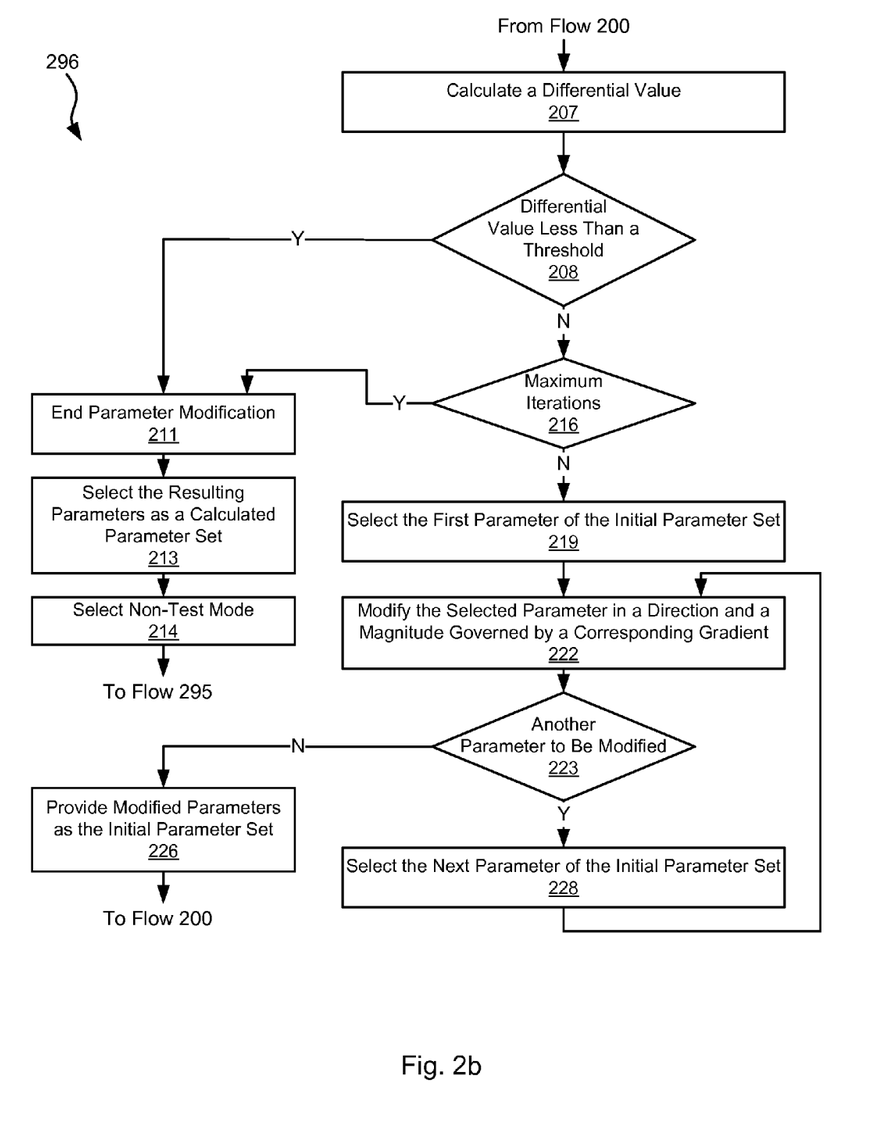

Turning to FIGS. 2a-2b, flow diagrams 200, 296 showing a method in accordance with some embodiments of the present invention for indirect parameter calibration. Following flow diagram 200 of FIG. 2a, test processing 201. During this test processing, known data is written and read back as part of calibrating a parameter set governing operation of a data processing circuit. In addition, an initial set of values for a parameter set is selected and write processing of a data input is performed using the initial set of values (block 202). Where the process is performed in relation to a storage device, the write process includes storing the data to a storage medium. The data generated during the write process is read back to yield a sensed signal (block 203). This sensed signal may be generated by a read/write head assembly in the case of a storage device. The sensed signal is amplified to yield an analog input signal (block 205), and the analog input signal is converted to a series of digital samples (block 210). This conversion may be done using an analog to digital converter circuit or system as are known in the art. Of note, any circuit known in the art that is capable of converting an analog signal into a series of digital values representing the received analog signal may be used. The digital samples are equalized to yield an equalized output (block 215) and the resulting equalized output is stored to a sample buffer (block 220). In some embodiments of the present invention, the equalization is done using a digital finite impulse response circuit as are known in the art. Based upon the disclosure provided herein, one of ordinary skill in the art will recognize a variety of equalizer circuits that may be used in place of such a digital finite impulse response circuit to perform equalization in accordance with different embodiments of the present invention.

It is determined whether a data detector circuit is available (block 225). Where the data detector circuit is available (block 225), the equalized output from the sample buffer is selected for processing and a data detection is performed on the selected equalized output to yield a detected output (block 230). The data detection may be, but is not limited to, a Viterbi algorithm data detection or a maximum a posteriori data detection. Based upon the disclosure provided herein, one of ordinary skill in the art will recognize other data detection algorithms that may be used in relation to different embodiments of the present invention.

It is determined whether another parameter in the set of initial parameter set is to be tested (block 235). This includes determining whether one or more of the parameters in the initial parameter set being calibrated remains to be modified and tested. Where another parameter of the parameter set remains to be tested (block 235), the next parameter in the initial parameter set is selected (block 240).

The selected parameter is modified and write processing of the same data input previously written is performed using the initial parameter set modified to include the modified value for the selected parameter (block 245). The data generated during the write process is read back to yield a sensed signal (block 248). The sensed signal is amplified to yield an analog input signal (block 250), and the analog input signal is converted to a series of digital samples (block 255). The digital samples are equalized to yield an equalized output (block 260) and the resulting equalized output is stored to a sample buffer (block 265).

It is determined whether a data detector circuit is available (block 270). Where the data detector circuit is available (block 270), the equalized output from the sample buffer is selected for processing and a data detection is performed on the selected equalized output to yield a detected output (block 275). In addition, interim noise predictive outputs and edge mean values corresponding to the detected output are generated.

A gradient between a first instance of the equalized output corresponding to the initial parameter set and a second instance of the equalized output corresponding to the modified initial parameter set is calculated (block 280). This gradient may be calculated by subtracting the second instance from the first instance on a position by position basis (e.g., on a bit by bit basis for a binary data processing system or on a symbol by symbol basis for a non-binary data processing system). This gradient, the interim noise predictive outputs and the edge mean values are stored corresponding to the selected parameter of the initial parameter set (block 285), and the value of the selected parameter of the initial parameter set is reset back to its original value in the initial parameter set (block 290). The processes of blocks 235-290 are then repeated for each parameter in the parameter set being calibrated.

Once no additional parameters in the initial parameter set remain to be tested (block 235), the process shifts to flow diagram 296 of FIG. 2b that is more fully discussed below.

Following flow diagram 296, a differential value is calculated in accordance with the following equation:

$$\left[(NPout_{k,i} - \overline{y}_{k,b_{i-D:i}})h_{k,j}E\left(\frac{\partial y_{i-j}}{\partial \text{parameter}_{k,b_{i-M:i}}}\right)\right],$$

where $NPout_{k,i}$ corresponds to the stored noise predictive value, $\overline{y}_{k,b_{i-D:i}}$ corresponds to the stored edge mean value, $h_{k,j}$ corresponds to the noise predictive filter coefficients used by noise predictive filters included in the data detector circuit, and $$E\left(\frac{\partial y_{i-j}}{\partial \text{parameter}_{k,b_{i-M:i}}}\right)$$

corresponds to the calculated gradient. It is determined whether the differential value is less than a threshold value (block 208). In some cases, the threshold value is programmable. Where the differential value is not less than the threshold value (block 208), it is determined if the maximum number of iterations in the calibration process have been exceeded (block 216). Where the maximum number of iterations has not been exceeded (block 216), the first parameter in the initial parameter set is selected (block 219), and the selected parameter is modified in a direction and a magnitude governed by a previously calculated corresponding gradient (block 222). In particular, the updated parameter value is calculated in accordance with the following equation described above in relation to FIG. 1:

$$\text{parameter}_{k,b_{i-M:i}} = \text{parameter}_{k,b_{i-M:i}} -$$
$$t\left[(NPout_{k,i} - \overline{y}_{k,b_{i-D:i}})h_{k,j}E\left(\frac{\partial y_{i-j}}{\partial \text{parameter}_{k,b_{i-M:i}}}\right)\right],$$

It is then determined whether another parameter in the initial parameter set remains to be updated (block 223). Where another parameter remains to be updated (block 223), the next parameter in the initial parameter set is selected (block 228) and updated in accordance with blocks 222-223. Alternatively, where no additional parameters remain to be updated (block 223), the modified initial parameter set including the updated values is provided as the initial parameter set (block 226) and the processes of flow diagram 200 are repeated using the new initial parameter set.

Alternatively, where either the maximum number of iterations have been exceeded (block 216) or the differential value is less than the threshold (block 208), the parameter modification ends (block 211). The resulting parameters are then selected as a calculated parameter set (block 213) and the non-test mode is selected (block 214). The non-test mode is more fully described in relation to flow diagram 295 of FIG. 2c.

Figure 2C:
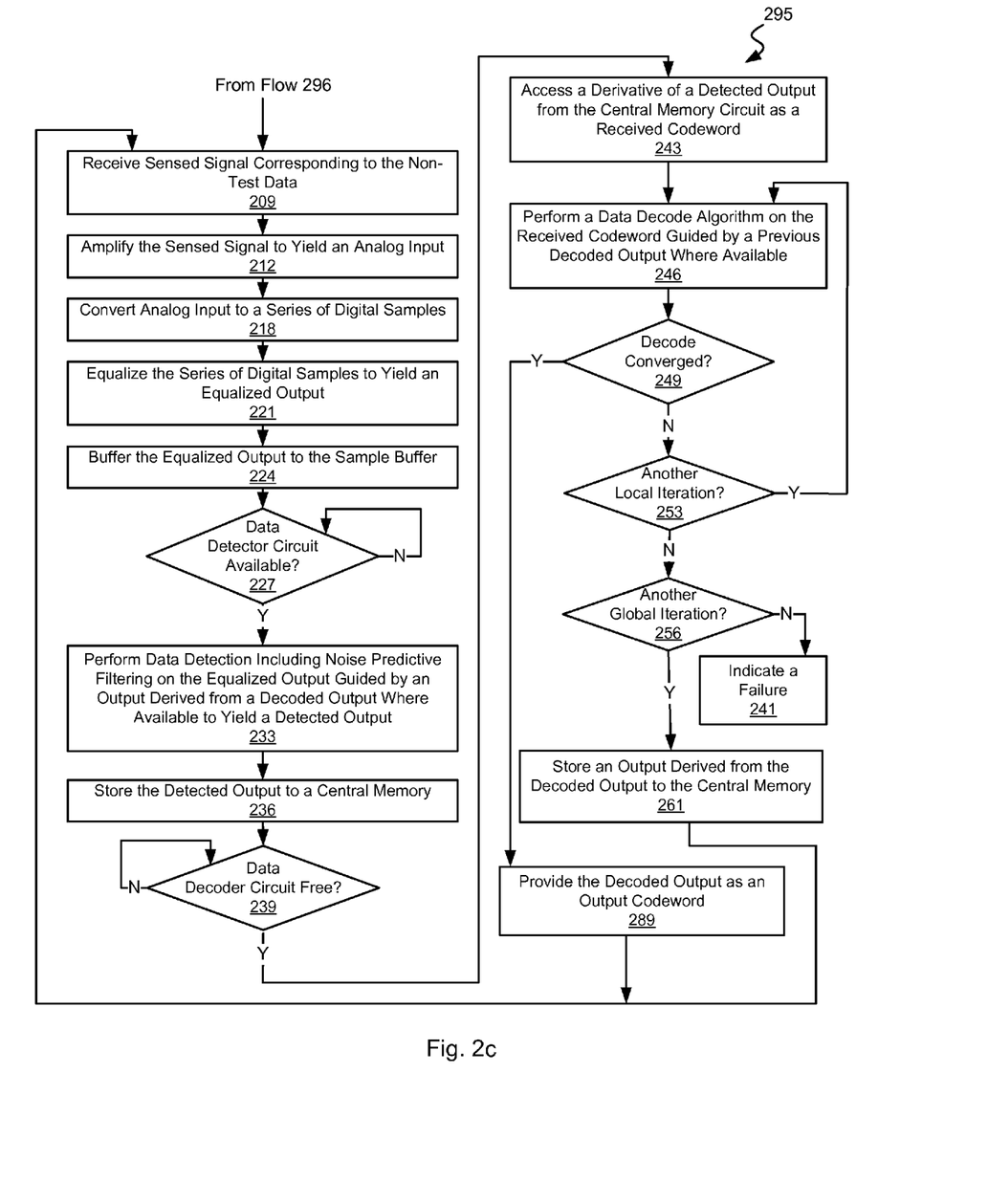
FIG. 2c is a flow diagram showing a method for standard data processing utilizing parameters calibrated in accordance with the method of FIGS. 2a-2b.

Turning to FIG. 2c, a sensed signal is received corresponding to data previously written using the calculated parameter set (bock 209). The sensed signal is amplified to yield an analog input signal (block 212), and the analog input signal is converted to a series of digital samples (block 218). The digital samples are equalized to yield an equalized output (block 221) and the resulting equalized output is stored to a sample buffer (block 224). It is determined whether a data detector circuit is available (block 227). Where the data detector circuit is available (block 227), the equalized output from the sample buffer is selected for processing and a data detection is performed on the selected equalized output to yield a detected output (block 233). The data detection is guided by an output derived from a decoded output where available. The detected output is stored to a central memory (block 236).

In parallel to the previously described data detection process, it is determined whether a data decoder circuit is available (block 239). The data decoder circuit may be, for example, a low density data decoder circuit as are known in the art. Where the data decoder circuit is available (block 239), a previously stored output derived from a detected output is accessed from the central memory and used as a received codeword (block 243). A data decode algorithm is applied to the received codeword to yield a decoded output (block 246). It is then determined whether the decoded output converged (e.g., resulted in the originally written data as indicated by the lack of remaining unsatisfied checks) (block 249). Where the decoded output converged (block 249), the converged codeword is provided as a decoded output (block 289).

Alternatively, where the decoded output failed to converge (e.g., errors remain) (block 249), it is determined whether another local iteration is desired (block 253). In some cases, as a default seven local iterations are allowed per each global iteration. Based upon the disclosure provided herein, one of ordinary skill in the art will recognize another default number of local iterations that may be used in relation to different embodiments of the present invention. Where another local iteration is desired (block 253), the data decode algorithm is re-applied using the current decoded output as a guide (block 246).

Alternatively, where another local iteration is not desired (block 253), it is determined whether another global iteration is allowed (block 256). As a default, another global iteration is allowed where there is sufficient available space in the central memory and an output memory reordering queue to allow another pass through processing the currently processing codeword. The amount of available space in the central memory and an output memory reordering queue is a function of how many iterations are being used by concurrently processing codewords to converge. Thus, the amount of time that a codeword may continue processing through global iterations is a function of the availability of central memory and an output memory reordering queue. By limiting the number of global iterations that may be performed, the amount of time a codeword may continue processing through global iterations can be reduced.

Where another global iteration is allowed (block 256), an output derived from the decoded output is stored to the central memory (block 261). The output derived from the decoded output being stored to the central memory triggers the data set ready query of block 227 to begin the data detection process. Alternatively, where another global iteration is not allowed (block 256), a failure to converge is indicated (block 241)

Figure 3:
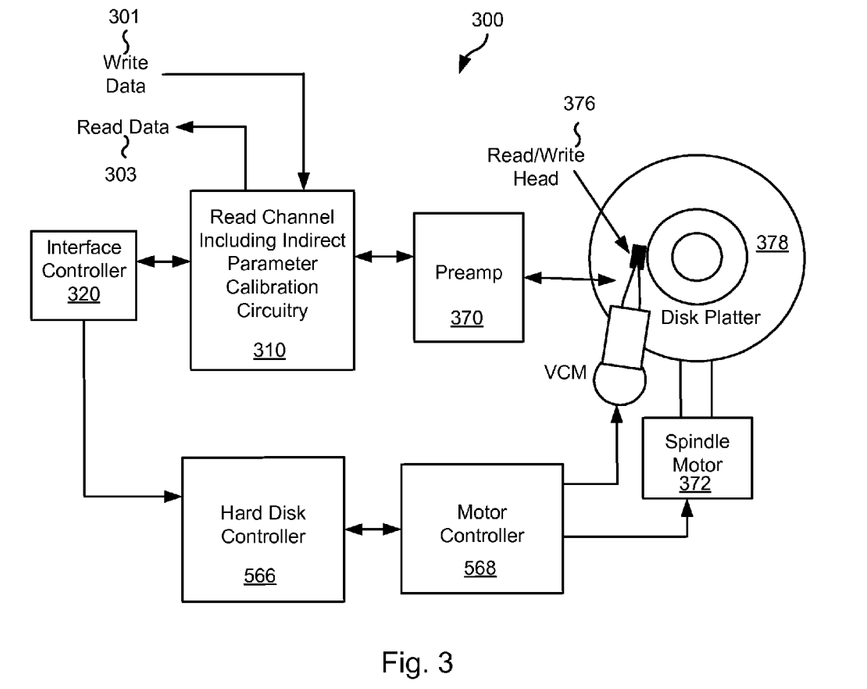
FIG. 3 shows a storage device including a read channel having indirect parameter calibration circuitry in accordance with one or more embodiments of the present invention.

Turning to FIG. 3, a storage system 300 including a read channel circuit 310 including a read channel having indirect parameter calibration circuitry is shown in accordance with some embodiments of the present invention. Storage system 300 may be, for example, a hard disk drive. Storage system 300 also includes a preamplifier 370, an interface controller 320, a hard disk controller 366, a motor controller 368, a spindle motor 372, a disk platter 378, and a read/write head assembly 376. Interface controller 320 controls addressing and timing of data to/from disk platter 378. The data on disk platter 378 consists of groups of magnetic signals that may be detected by read/write head assembly 376 when the assembly is properly positioned over disk platter 378. In one embodiment, disk platter 378 includes magnetic signals recorded in accordance with either a longitudinal or a perpendicular recording scheme.

In a typical read operation, read/write head assembly 376 is accurately positioned by motor controller 368 over a desired data track on disk platter 378. Motor controller 368 both positions read/write head assembly 376 in relation to disk platter 378 and drives spindle motor 372 by moving read/write head assembly to the proper data track on disk platter 378 under the direction of hard disk controller 366. Spindle motor 372 spins disk platter 378 at a determined spin rate (RPMs). Once read/write head assembly 378 is positioned adjacent the proper data track, magnetic signals representing data on disk platter 378 are sensed by read/write head assembly 376 as disk platter 378 is rotated by spindle motor 372. The sensed magnetic signals are provided as a continuous, minute analog signal representative of the magnetic data on disk platter 378. This minute analog signal is transferred from read/write head assembly 376 to read channel circuit 310 via preamplifier 370. Preamplifier 370 is operable to amplify the minute analog signals accessed from disk platter 378. In turn, read channel circuit 310 decodes and digitizes the received analog signal to recreate the information originally written to disk platter 378. This data is provided as read data 303 to a receiving circuit. A write operation is substantially the opposite of the preceding read operation with write data 301 being provided to read channel circuit 310. Read channel circuit 301 encodes and processes write data 301 through, for example, a data encoding circuit, a write pre-compensation circuit, and a write driver circuit that are governed by parameters. The encoded and processed write data is then transferred to disk platter 378 via read/write head assembly 376.

During a read operation, data is sensed from disk platter 378 and processed through a data processing circuit including a data detector circuit. The parameters controlling the write processing are calibrated using interim information derived from the data detector circuit, and as such the calibration is referred to as indirect calibration. This indirect calibration is supported by a read channel circuit 310 including a circuit similar to that set forth in FIGS. 1a-1b, and/or operates similar to the method discussed above in relation to FIGS. 2a-2b.

It should be noted that storage system 300 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 300, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 310 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 300 may be modified to include solid state memory that is used to store data in addition to the storage offered by disk platter 378. This solid state memory may be used in parallel to disk platter 378 to provide additional storage. In such a case, the solid state memory receives and provides information directly to read channel circuit 310. Alternatively, the solid state memory may be used as a cache where it offers faster access time than that offered by disk platted 378. In such a case, the solid state memory may be disposed between interface controller 320 and read channel circuit 310 where it operates as a pass through to disk platter 378 when requested data is not available in the solid state memory or when the solid state memory does not have sufficient storage to hold a newly written data set. Based upon the disclosure provided herein, one of ordinary skill in the art will recognize a variety of storage systems including both disk platter 378 and a solid state memory.

Figure 4:
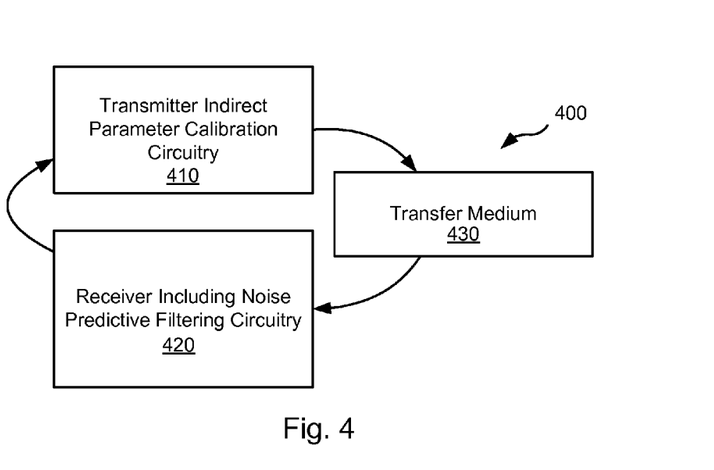
FIG. 4 shows a data transmission device including a transmitter having indirect parameter calibration circuitry and a receiver including noise predictive filtering circuitry is shown in accordance with some embodiments of the present invention.

Turning to FIG. 4, a data transmission device 400 including a transmitter 410 having indirect parameter calibration circuitry and a receiver 420 including noise predictive filtering circuitry is shown in accordance with some embodiments of the present invention. Transmitter 410 performs write processing to prepare a received data set for transfer to receiver 420 via transfer medium 430. This write processing may include processing through, for example, a write pre-compensation circuit and/or a write driver circuit that are each controlled by parameters. These parameters are in part calibrated based upon the outputs from noise predictive filters in receiver 420, and as such the calibration is referred to as indirect calibration. This indirect calibration is supported by circuitry similar to that set forth in FIGS. 1a-1b, and/or operates similar to the method discussed above in relation to FIGS. 2a-2b.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the system comprising:
   a write circuit including:
      a write processing circuit operable to modify a write data set based at least in part on a write parameter to yield a write output;
      a calibration circuit operable to adjust the write parameter based at least in part on both a noise predictive output and an edge mean value; and
   a read circuit including a data detector circuit operable to generate the noise predictive output and the edge mean value corresponding to the noise predictive output based upon a detector input derived from a read input, wherein the read input corresponds to the write output transferred via a medium.

2. The data processing system of claim 1, wherein the write parameter is a first write parameter, wherein the write processing circuit further includes:
   a write pre-compensation circuit operable to modify the write data set based at least in part on the first write parameter to yield an interim data set;
   a write driver circuit operable to adjust the interim data set based at least in part on a second write parameter to yield the write output in a form acceptable to a write head disposed in relation to the medium; and
   wherein the calibration circuit is operable to adjust the second write parameter based at least in part on a detector output.

3. The data processing system of claim 1, wherein the noise predictive output is a first noise predictive output and the edge mean value is a first edge mean value; wherein the data detector circuit is operable to calculate a second edge mean value and a second noise predictive output using the same detector input used to calculate the first edge mean value and the first noise predictive output; and wherein the calibration circuit is operable to adjust the write parameter based at least in part on all of the first noise predictive output, the second noise predictive output, the first edge mean value, and the second edge mean value.

4. The data processing system of claim 1, wherein the write circuit further comprises:
   a gradient calculation circuit operable to:
      receive a first gradient input derived from the read input corresponding to a first instance of the write parameter;
      receive a second gradient input derived from the read input corresponding to a second instance of the write parameter;
      calculate a gradient as a difference between the first gradient input and the second gradient input; and
   wherein the calibration circuit is operable to adjust the write parameter based at least in part on all of the noise predictive output, the edge mean value, and the gradient.

5. The data processing system of claim 1, wherein the write circuit further comprises:
a gradient calculation circuit operable to:
receive a first gradient input derived from the read input corresponding to a first instance of the write parameter;
receive a second gradient input derived from the read input corresponding to a second instance of the write parameter; and
calculate a gradient as a difference between the first gradient input and the second gradient input.

6. The data processing system of claim 1, wherein the medium is a storage medium, and wherein the data processing system is implemented as part of a storage device.

7. The data processing system of claim 1, wherein the data processing system is implemented as part of an integrated circuit.

8. The data processing system of claim 1, wherein the data detector circuit is selected from a group consisting of: a Viterbi algorithm data detector circuit, and a maximum a posteriori data detector circuit.

9. A method for adjusting data processing, the method comprising:
receiving a write data set;
modifying the write data set to yield a write output based at least in part on a write parameter to yield a write output;
generating the write parameter based at least in part on both a noise predictive output and an edge mean value corresponding to the noise predictive output;
transferring the write output to a read input via a medium; and
applying a data detection algorithm to a detector input derived from the read input to yield the noise predictive output.

10. The method of claim 9, wherein the noise predictive output is a first noise predictive output and the edge mean value is a first edge mean value; wherein applying the data detection algorithm to the detector input is further operable to generate a second edge mean value and a second noise predictive output using the same detector input used to calculate the first edge mean value and the first noise predictive output; and wherein the generating the write parameter is based at least in part on all of the first noise predictive output, the second noise predictive output, the first edge mean value, and the second edge mean value.

11. The method of claim 9, the method further comprising:
receiving a first gradient input derived from the read input corresponding to a first instance of the write parameter;
receiving a second gradient input derived from the read input corresponding to a second instance of the write parameter; and
calculating a gradient as a difference between the first gradient input and the second gradient input.

12. A data processing system, the system comprising:
a write circuit including:
a write processing circuit operable to modify a write data set based at least in part on a write parameter to yield a write output;
a gradient calculation circuit operable to:
receive a first gradient input derived from the read input corresponding to a first instance of the write parameter;
receive a second gradient input derived from the read input corresponding to a second instance of the write parameter; and
calculate a gradient as a difference between the first gradient input and the second gradient input; and
a calibration circuit operable to adjust the write parameter based at least in part on a detector output, wherein the calibration circuit is operable to adjust the write parameter based at least in part on both the detector output and the gradient; and
a read circuit including a data detector circuit operable to generate the detector output based upon a detector input derived from a read input, wherein the read input corresponds to the write output transferred via a medium.

13. The data processing system of claim 12, wherein the write parameter is a first write parameter, wherein the write processing circuit further includes:
a write pre-compensation circuit operable to modify the write data set based at least in part on the first write parameter to yield an interim data set;
a write driver circuit operable to adjust the interim data set based at least in part on a second write parameter to yield the write output in a form acceptable to a write head disposed in relation to the medium; and
wherein the calibration circuit is operable to adjust the second write parameter based at least in part on the detector output.

14. The data processing system of claim 12, wherein the detector output is selected from a group consisting of: a noise predictive output, and an edge mean value.

15. The data processing system of claim 12, wherein the medium is a storage medium, wherein the data processing system is implemented as part of a storage device, and wherein the storage device further comprises:
a read/write head assembly disposed in relation to the storage medium.

16. The data processing system of claim 12, wherein the write parameter is a first write parameter, wherein the write processing circuit further includes:
a write pre-compensation circuit operable to modify the write data set based at least in part on the first write parameter to yield an interim data set;
a write driver circuit operable to adjust the interim data set based at least in part on a second write parameter to yield the write output in a form acceptable to a write head disposed in relation to the medium; and
wherein the calibration circuit is operable to adjust the second write parameter based at least in part on the detector output.

17. The data processing system of claim 12, wherein the detector output is a noise predictive output, wherein data detector circuit is further operable to calculate an edge mean value corresponding to the noise predictive output, and wherein the calibration circuit is operable to adjust the write parameter based at least in part on both the noise predictive output and the edge mean value.

18. The data processing system of claim 17, wherein the noise predictive output is a first noise predictive output and the edge mean value is a first edge mean value; wherein the data detector circuit is operable to calculate a second edge mean value and a second noise predictive output using the same detector input used to calculate the first edge mean value and the first noise predictive output; and wherein the calibration circuit is operable to adjust the write parameter based at least in part on all of the first noise predictive output, the second noise predictive output, the first edge mean value, and the second edge mean value.

19. The data processing system of claim 12, wherein the data processing system is implemented as part of an integrated circuit.

20. The data processing system of claim 12, wherein the data detector circuit is selected from a group consisting of: a Viterbi algorithm data detector circuit, and a maximum a posteriori data detector circuit.

* * * * *